United States Patent
Wouters-Bunt et al.

(10) Patent No.: US 12,141,951 B2
(45) Date of Patent: Nov. 12, 2024

(54) METHOD AND APPARATUS FOR CONTRAST ENHANCEMENT

(71) Applicant: Georg-August-Universität Göttingen Stiftung Öffentlichen Rechts Universitätsmedizin, Göttingen (DE)

(72) Inventors: Freddy Silvester Wouters-Bunt, Göttingen (DE); Stephan Hock, Göttingen (DE)

(73) Assignee: Georg-August-Universität Göttingen Stiftung Öffentlichen Rechts Universitätsmedizin, Göttingen (DE)

(*) Notice: Subject to any disclaimer, the term of this patent is extended or adjusted under 35 U.S.C. 154(b) by 384 days.

(21) Appl. No.: 17/768,947

(22) PCT Filed: Oct. 14, 2020

(86) PCT No.: PCT/EP2020/078880
§ 371 (c)(1),
(2) Date: Apr. 14, 2022

(87) PCT Pub. No.: WO2021/074213
PCT Pub. Date: Apr. 22, 2021

(65) Prior Publication Data
US 2022/0398702 A1    Dec. 15, 2022

(30) Foreign Application Priority Data
Oct. 15, 2019  (DE) ............. 10 2019 127 846.5

(51) Int. Cl.
*G06T 5/00*    (2024.01)
*G06T 5/94*    (2024.01)
*G06V 10/74*   (2022.01)

(52) U.S. Cl.
CPC .............. *G06T 5/94* (2024.01); *G06V 10/761* (2022.01)

(58) Field of Classification Search
None
See application file for complete search history.

(56) References Cited

U.S. PATENT DOCUMENTS 10,409,052 B2 *  9/2019  Liu ................. G02B 21/16
2015/0022881 A1 *  1/2015  Loza Alvarez .... G02B 27/0075
                                                    359/385

(Continued)

FOREIGN PATENT DOCUMENTS

DE    10250775 A1    6/2003
WO    2017075275 A1   5/2017

OTHER PUBLICATIONS

Mohammad Shorif Uddin et al, "Restoration of Uneven Illumination in Light Sheet Microscopy Images," Microscopy and Microanalysis, pp. 1-7, Aug. 1, 2011 (Year: 2011).*

(Continued)

*Primary Examiner* — Akwasi M Sarpong
*Assistant Examiner* — Pawan Dhingra
(74) *Attorney, Agent, or Firm* — IP Spring

(57) ABSTRACT

A method of contrast enhancement of a three-dimensional light sheet microscopy image formed from N individual images each corresponding to a light sheet plane and spaced apart from each other in the z-direction by at least a distance d, the x/y-plane being the light sheet plane and the x-direction being the propagation direction of the light sheet of the light sheet plane, comprising:
Deconvolution of the three-dimensional image in the z-direction, comprising: For each intensity vector of N intensities $(I_{x,y,1}, \ldots, I_{x,y,N})$ having the same x/y value, performing a multiplication with a tridiagonal N×N deconvolution matrix, which assigns to each voxel (x, y, n) a correction parameter f1, with which, by the multiplication of the deconvolution matrix with the intensity vector, for a component I(x, y, n) of the intensity vector the intensities Ix, y, (Continued)

n+1 and Ix, y, n−1 of the corresponding voxels of the neighboring image plane are multiplied, before they are subtracted from the intensity value I(x, y, n).

7 Claims, 19 Drawing Sheets

(56) References Cited

U.S. PATENT DOCUMENTS

| | | | | |
|---|---|---|---|---|
| 2019/0170646 | A1* | 6/2019 | Fiolka | G02B 21/0076 |
| 2019/0324244 | A1* | 10/2019 | Kozorovitskiy | G02B 21/367 |
| 2021/0049338 | A1* | 2/2021 | Kaufman | G06T 7/0012 |
| 2021/0325651 | A1* | 10/2021 | Tsia | G02B 21/0032 |
| 2022/0026696 | A1* | 1/2022 | Spiecker | G02B 21/0032 |

OTHER PUBLICATIONS

Bogdan Toader et al., "Image Reconstruction in Light-Sheet Microscopy: Spatially Varying Deconvolution and Mixed Noise" Journal of Mathematical Imaging and Vision, Jun. 14, 2022, pp. 968-992 (Year: 2022).*

Uddin, Mohammad Shorif et al, "Restoration of Uneven Illumination in Light Sheet Microscopy Images," Microscopy and Microanalysis, Bd. 17, Nr. 4, pp. 607-613, Aug. 1, 2011.

Wang, D. et al., "Sheet-scanned dual-axis confocal microscopy using Richardson-Lucy deconvolution," Optics Letters, Optical Society of America, Bd. 39, Nr. 18, pp. 5431-5434, Sep. 15, 2014.

EPO, International Search Report for International Patent Application No. PCT/EP2020/078880, 7 pages, Jan. 29, 2021.

EPO, Written Opinion for International Patent Application No. PCT/EP2020/078880, 7 pages, Jan. 29, 2021.

* cited by examiner

METHOD AND APPARATUS FOR CONTRAST ENHANCEMENT

CROSS-REFERENCE TO RELATED APPLICATIONS

This application is the U.S. National Stage filing under 35 U.S.C. § 371 of International Patent Application No. PCT/EP2020/078880, filed on Oct. 14, 2020, which in turn claims priority under PCT Article 8 and/or 35 U.S.C. § 119(a) to German Patent Application No. 10 2019 127 846.5, filed on Oct. 15, 2019. German Patent Application No. 10 2019 127 846.5 is incorporated herein by reference in its entirety.

BACKGROUND OF THE INVENTION

In microscopy, deconvolution of measured image data is an important and frequent application. Commercial software is available to perform this for common microscope types, especially confocal microscopy. However, in the special case of macroscopic light sheet microscopy, these generalized solution approaches are not applicable because the required point spread function (psf) changes depending on the position within the tissue, i.e., it is not homogeneous. A sufficiently high resolution in the dimension normal to the light sheet is required to discretize a psf sufficiently tightly, or to determine it iteratively. However, for samples on the order of several millimeters, the amount of data required then increases very sharply, even if a lower resolution would be sufficient from a pathological point of view. The additional expense associated with data storage and evaluation is a decisive economic factor.

theoretically possible approach to deconvolution is the calculation of inverse psf using the so-called linear deconvolution methods, as described, for example, in SARDER, Pinaki; NEHORAI, Arye. Deconvolution methods for 3-D fluorescence microscopy images. IEEE Signal Processing Magazine, 2006, 23rd yr, no. 3, pp. 32-45. Approaches to numerical computation of inverse psf via least squares methods are presented in PREZA, Chrysanthe, et al. Regularized linear method for reconstruction of three-dimensional microscopic objects from optical sections, JOSA A, 1992, 9th yr, no. 2, pp. 219-228.

Classical deconvolution is the division of the convolutional image by the psf in frequency space with the appropriate noise handling considerations, e.g., the application of a low-pass filter. In this case, linear deconvolution results in an image correction that improves contrast by "subtracting out" the "smearing" of points produced by the psf from the image. This poses a challenge in reality, especially for three-dimensional images of non-homogeneous tissue, because the psf changes depending on the position in the tissue.

It is true that a discrete but finite psf (with a finite number of entries in the convolution matrix) can be inverted in some special cases, namely when the psf is a multiplicative function. However, most finite discrete psf, and all multidimensional psf, result in inverse psf with infinitely many entries whose magnitudes do not tend to zero with increasing distance from the measurement point to be deconvolved. Since only a finite number of measurement points are available, this approach does not lead to useful results in practice. In microscopic resolutions, therefore, deconvolution must be performed by division in frequency space. But even then, the problem of location-dependent psf remains unsolved.

As mentioned above, in light sheet microscopy a high resolution in the dimension normal to the light sheet would be necessary to discretize a psf sufficiently tightly, respectively to determine it iteratively. This would require a comparatively small distance between the individual light sheet planes, which is accompanied by the aforementioned problems such as a large amount of data and instability of the solution.

SUMMARY OF THE INVENTION

According to an embodiment a method of contrast enhancement of a three-dimensional light sheet microscopy image formed from N individual images each corresponding to a light sheet plane and spaced apart from each other in the z-direction by at least a distance d, the x/y-plane being the light sheet plane and the x-direction being the propagation direction of the light sheet of the light sheet plane, comprises:

Deconvolution of the three-dimensional image in the z-direction, comprising: For each intensity vector of N intensities $(I_{x,y,1}, \ldots, I_{x,y,N})$ having the same x/y value, performing a multiplication with a tridiagonal N×N deconvolution matrix, which assigns to each voxel (x, y, n) a correction parameter f1, with which, by the multiplication of the deconvolution matrix with the intensity vector, for a component I(x, y, n) of the intensity vector the intensities Ix, y, n+1 and Ix, y, n−1 of the corresponding voxels of the neighboring image plane are multiplied, before they are subtracted from the intensity value I(x, y, n).

This form of deconvolution in the z-direction takes advantage of the macroscopic property of light sheet microscopy that the distance between individual light sheet planes is such that only the immediately adjacent light sheet need be considered in the deconvolution in the z-direction because the more distant light sheet planes do not contribute significantly. This reduces the deconvolution matrix for the N voxels in the z-direction for a given x/y value to a tridiagonal N×N matrix, which for a given voxel assigns only a correction value f1 for the respective neighboring image planes. The deconvolution is thus greatly simplified compared to conventional approaches.

According to one embodiment, the correction factor f1 is chosen to be larger as the depth of penetration of the light sheet into the tissue increases.

This takes into account the fact that the light sheet (and thus the psf) expands in the z-direction with increasing penetration of the light sheet into the tissue in the x-direction According to one embodiment, the method further comprises:
Determining the correction factor f1 at the point of entry of the light sheet into the tissue by:
  calculating the deconvolution as well as a quality measure of the deconvolved image based on different correction parameters f1 for a section of the whole image comprising the first k voxels in x-direction starting from the penetration location of the light sheet, where k is small compared to the extent of the image in x-direction, and
  choosing the correction parameter f1 for which the calculated quality measure corresponds to the largest quality improvement.

In this way, the correction factor at the entry point of the light sheet can be determined experimentally or computationally based on the acquired image.

According to one embodiment, the method further comprises:

Representing the dependence of the correction value f1 on the penetration depth in the x-direction by a monotonically increasing function of the correction value f1 (x);
calculating, for different functions f1 (x), the respective deconvolution in z-direction of the whole image as well as a quality measure of the deconvolved whole image, selection of that function f1 (x), which provides the best quality measure, as a function to represent the entry depth dependent correction value f1 (x).

In this way, the penetration depth-dependent correction function and thus also the deconvolution matrix for deconvolution in the z-direction can be determined.

According to one embodiment, the method further comprises:
Deconvolving the image in the x/y plane for each image plane using a two-dimensional point spread function whose radius depends on the tissue depth of the voxel to be deconvolved in the z-direction.

In this way, lateral deconvolution can be performed, taking into account the tissue depth dependence of the point spread function According to one embodiment, the method further comprises:

For each image plane, performing the two-dimensional deconvolution for different point spread functions that are tissue depth dependent;
computing a quality measure for the deconvolved image, selecting a tissue depth dependent point spread function that leads to an improved contrast value from the plurality of point spread functions for which the deconvolution has been computed.

In this way, a suitable point spread function for lateral deconvolution can be determined.

According to one embodiment, for the tissue depth-dependent point spread function, a function is used the radius of which increases with increasing tissue depth, whereby, however, preferably the increase of the radius increase decreases steadily.

This approach for the point spread function takes into account the result of Monte Carlo simulation concerning the shape and tissue depth dependence of the point spread function.

According to one embodiment, as the point spread function a function is chosen for which the average amplitude of the high spatial frequencies lying beyond a spatial frequency threshold is a minimum or does not deviate from a minimum by more than a predetermined threshold value.

This takes into account the fact that selection of the point spread function based only on image quality improvement may favor those point spread functions that lead to artifacts due to high frequency components. By selecting a point spread function where the average amplitude of the high spatial frequencies is a minimum or does not deviate more than a threshold from such a minimum, artifacts can be avoided.

According to one embodiment, the distance between two light sheet planes is greater than the half-width of the point spread function in the z-direction.

This constraint ensures that this is a "macroscopic" light sheet microscopy, where correction in the z-direction is possible by means of a tridiagonal matrix that considers only the immediate neighbors.

DETAILED DESCRIPTION

Figure 1:
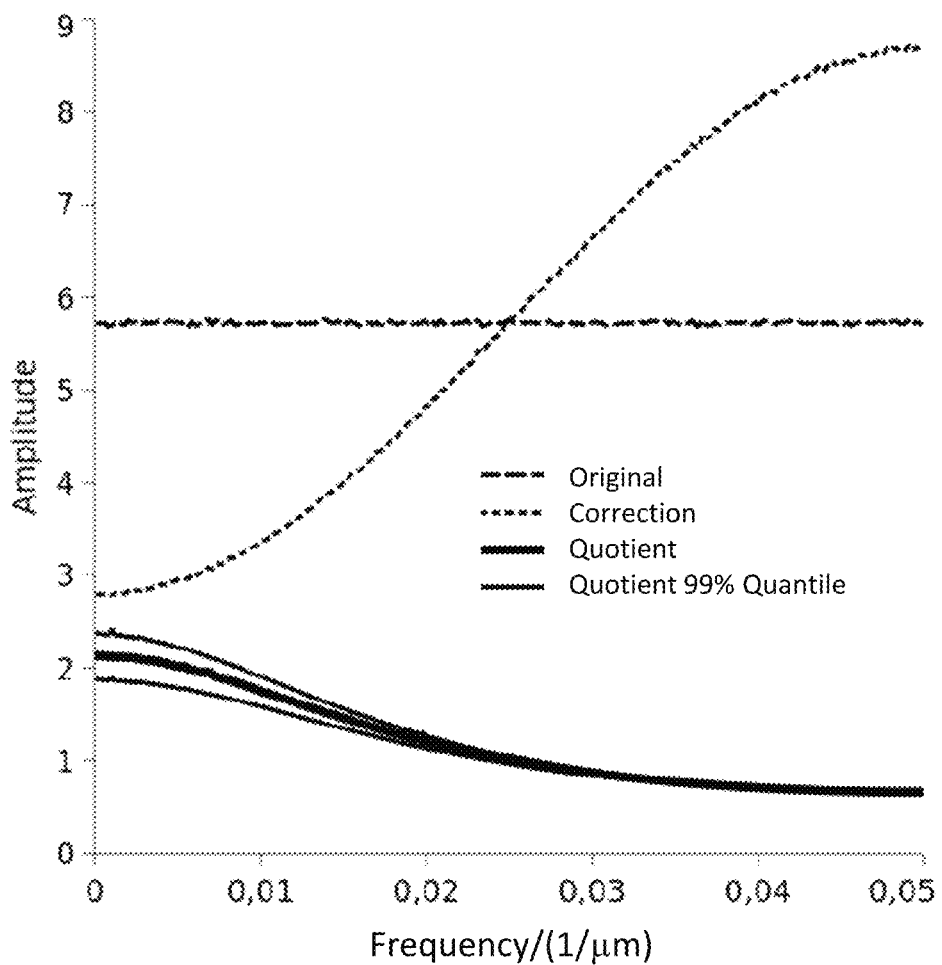
FIGS. 1 to 4 show the results of a simulation of a deconvolution in z-direction according to an embodiment for a set of randomly generated one-dimensional intensity vectors.

The present invention takes a novel approach to deconvolution of light sheet microscopy images, which is described below with reference to embodiments.

In light sheet microscopy, the illumination direction and detection direction are orthogonal to each other. A light sheet generated by laser or cylindrical optics is adjusted in the focal plane of the detection objective. By moving the sample, the light sheet "travels" through the sample in the z-direction, an image taken at a certain z-value then corresponds to a light sheet plane. By capturing images each corresponding to light sheet planes with different z-values, an image stack of images corresponding to different sectional planes of the specimen is thus created, ultimately resulting in a three-dimensional image in which an image plane in the z-direction corresponds to a light sheet plane.

According to one embodiment, for the deconvolution of such an image, first a deconvolution in the direction perpendicular to the light sheet plane (z-direction) is performed. The manner in which this deconvolution in the z-direction (hereinafter referred to as the z-direction is the direction of the objective axis perpendicular to the plane of the light sheet) is performed has some special features. First of all, this deconvolution in direction perpendicular to the light sheet plane is based on the (justified) assumption that at macroscopic distance between two images resp. their light sheet planes is larger than the half-value width of the point spread function. This has the consequence that for an n-th image in the stack of altogether N images corresponding to light sheet planes, only the two immediately adjacent images corresponding to light sheet planes, i.e. the (n−1)-th and the (n+1)-th image, have an influence on the n-th image and therefore only these two must be considered in the deconvolution. This assumption significantly simplifies the deconvolution matrix for deconvolution in the z-direction.

Therefore, for deconvolution, according to an embodiment example, for a given voxel I(x, y, n) of the nth image plane, the intensity I(x, y, n+1) of the neighboring voxel of the adjacent image plane is multiplied by a correction factor and subtracted from the intensity I(x, y, n). he same happens with the intensity I(x, y, n+1) of the other neighboring voxel in z-direction. In this way the deconvolution of the N voxels in z-direction for a given location x/y in the x/y-plane is done by means of a tridiagonal matrix, which assigns as multiplication factor the correction factor f1 to the intensities of the neighboring image planes respectively, In other words: For each intensity vector of N intensities $(I_{x,y,1}, \ldots, I_{x,y,N})$ with the same x/y-value of the image the multiplication with a tridiagonal N×N deconvolution matrix is performed for the purpose of deconvolution, which assigns to each voxel (x, y, n) of the intensity vector $(I_{x,y,1}, \ldots, I_{x,y,N})$ a correction parameter f1, with which, by the multiplication of the deconvolution matrix with the intensity vector, for the component I(x, y, n) of the intensity vector the intensities Ix, y, n+1 and Ix, y, n−1 of the corresponding voxels of the neighboring image plane are multiplied, before they are subtracted from the intensity value I(x, y, n).

According to an embodiment, a constant correction factor f1 may be applied as an approximation in this process. According to an embodiment a value smaller than 0.5 is arbitrarily chosen as correction factor. However, the arbitrary selection of a correction factor does not necessarily lead to an optimized result.

In order to select a suitable correction factor, it can be determined experimentally or by means of an optimization calculation according to a further embodiment. For this purpose, for example, the deconvolution can be calculated for different correction factors and then a contrast value (or another quality measure) can be determined for the image after deconvolution. The correction factor f1 that provides the greatest enhancement in contrast (or the greatest enhancement in another quality measure) can then be chosen as the correction factor for the tridiagonal deconvolution matrix.

However, such an approach does not take into account that the more the light sheet expands in the z-direction, the more it penetrates the tissue in the x-direction (i.e., the direction of light sheet propagation). To account for this effect, the correction factor according to a further embodiment can be selected depending on the position in the propagation direction of the light sheet (x-direction). The widening of the light sheet in the z-direction with increasing penetration of the light sheet into the tissue in the direction of propagation of the light (x-direction) is then taken into account, for example, by selecting a larger correction factor f1 with increasing penetration depth of the light sheet into the tissue.

According to one embodiment, the correction factor f1 is selected as a function of the penetration depth x, with f1(x) preferably increasing monotonically as x increases.

According to one embodiment, f1(x) can be determined experimentally for such an approach as follows. First, the deconvolution of the image section is calculated for different values of f1 for an image section near the entry location of the light sheet, for example for an image section with small x values. It is justifiably assumed that for small x-values, i.e. for small tissue depths in the x-direction, the light sheet has not yet significantly expanded and thus the correction value f1 for these x-values can be approximated by a constant factor corresponding to the correction value f1 at the point of entry of the light sheet into the tissue. Preferably, the number of voxels in the x-direction used for image cropping is small compared to the total number of voxels of the overall image in the x-direction. For example, less than the first 20% of the voxels in the x-direction are used for image cropping, alternatively less than 10%, further alternatively less than 5%, further alternatively less than 1%. Further alternatively, for example, the first two, the first three, the first 4, or the first 5-10 voxels in the x-direction may be selected as the image section to be used. For all these examples, the number of voxels in the x-direction of the selected image section for optimization is small compared to the total number of voxels in the x-direction, i.e., an image section is selected that corresponds to a small penetration depth of the light sheet in the x-direction.

For the selected image section, the deconvolved image is then calculated for different parameters f1 and then a quality measure of the deconvolved image is calculated, e.g., a contrast value. The parameter f1 that provides the "best" quality measure for the deconvolved image is then chosen as the correction parameter f1(0) for the entry point of the light sheet.

The deconvolution of the psf can then be mapped by a monotonically increasing function of the correction value f1(x). For different functions, the respective deconvolution in z-direction and a quality measure of the deconvolved image are then calculated again for the whole image. The function f1(x) which provides the best quality measure (e.g. the largest contrast enhancement) is then chosen as the function to represent the entry depth dependent psf or to form the corresponding deconvolution matrix with its entries f1.

With the penetration depth-dependent deconvolution matrix determined in this way, deconvolution in the z-direction can be performed with little effort and yet with a significant quality-improving effect.

In a further step, which if necessary can also be carried out independently of the correction of the light sheet thickness in the z-direction, i.e. the deconvolution in the z-direction, the deconvolution is then carried out in the x/y-plane.

According to one embodiment, a two-dimensional psf is used for this purpose, the radius of which depends on the tissue depth in the z-direction, i.e., in the objective direction. For different initial functions for the point spread function, the two-dimensional deconvolution is thereby performed for each light sheet depending on the tissue depth, and a quality measure for the deconvolved image is calculated, e.g., a contrast value. According to one embodiment, a tissue depth-dependent psf is then selected that results in an improved contrast value.

According to another embodiment, for the tissue depth dependent psf a function is used where the radius increases with increasing tissue depth, but preferably the increase of the radius increase decreases steadily.

According to one embodiment, a function is chosen as the point spread function for which the average amplitude of the high spatial frequencies that lie beyond a spatial frequency threshold is a minimum or does not deviate from a minimum by more than a predetermined threshold.

This accounts for the fact that a point spread function selection based solely on image quality enhancement may favor point spread functions that result in artifacts due to high frequency components. By selecting a point spread function in which the average amplitude of the high spatial frequencies is a minimum or does not deviate from such a minimum by more than a threshold value, artifacts can be avoided. For example, the threshold value can be a certain percentage of the minimum value, e.g.: 10%, 15% or 20%. Other reasonable threshold values are also conceivable for the skilled person, e.g. 30% of the minimum, 40% of the minimum, or 50% of the minimum. The value should be chosen in such a way that it can still be reasonably described as being "close to the minimum". This can also be the case, for example, if the value deviates from the minimum value by a certain percentage, e.g.: 20%, 30%, or 40% of the difference between minimum and maximum.

If a point spread function has been selected taking into account the contrast enhancement as well as the average amplitude of the high spatial frequencies, the two-dimensional deconvolution can then be performed using a standard procedure (such as the Richardson-Lucy algorithm).

For this purpose, groups of pixels of similar tissue depths are preferably formed from the set of local tissue depths on an image. The number of these groups is freely selectable. For each group of pixels the mean local tissue depth, thus the local tissue depth dependent point spread function is calculated. Deconvolution is then performed for each group on the entire image according to the local mean psf. Only then is the masking of the deconvolved images performed according to the pixel groups. Combined, they result in the fully deconvolved image.

The deconvolution of the entire image is then the result of the deconvolution in the z-direction (the correction of the "light sheet thickness" by means of a tridiagonal deconvolution matrix) and the two-dimensional deconvolution in the x/y-plane based on a two-dimensional psf.

A new aspect of the previously described methodology according to an embodiment are the consideration of the tissue depth in two spatial directions (light sheet propagation and detection axis); the separation of the spatial directions during the correction, and thus the simplification of the deconvolution to the two-dimensional case, as well as the combination of empirical and theoretical approaches to optimize the algorithm and to determine the point spread functions, respectively.

The light sheet thickness correction uses the macroscopic resolution of the image stack in the z-direction to compute an exact inverse convolution matrix. This allows contrast improvement even in this resolution range, where classical algorithms would not allow correction. The algorithm is stable and fast. Additional image planes that are of no interest to the user do not have to be included, which saves time even during the actual measurement on the microscope. The low computational cost allows the correction to be adjusted for spatial changes in light sheet thickness as a result of scattering and deflection of the light sheet in the tissue. If the factors of the spatial adjustment are determined indirectly from the image data, statements about precisely this spatial structure of the light sheet can be obtained recursively.

In the application case of the light sheet microscope, the three-dimensional convolution can be decomposed as described into a two-dimensional convolution on the plane of the light sheet, caused by the light refraction during the transmission of the fluorescent emission or scattering of the excitation by the tissue, and a one-dimensional convolution, caused by the thickness of the light sheet. If the light sheet convolution caused by the thickness of the light sheet in the direction of the objective can be back-calculated, then in principle established deconvolution methods can be applied to the two-dimensional deconvolution in the plane of the light sheet.

According to one embodiment, the three-dimensional image is transformed into a new coordinate system by converting the distance of each voxel from the tissue surface in detection direction. The transformed image is then deconvolved with a tissue depth-dependent psf.

Light sheet correction, i.e., correction of light sheet thickness or deconvolution in the z-direction, precedes tissue depth-dependent lateral deconvolution to generate a uniformly illuminated output image with distinct tissue boundaries. Since deconvolution requires knowledge of tissue depth, the two process steps are directly coupled. Empirical methods based on a determination of the information content of the deconvolved image (such as a contrast determination) are used to determine the parameters of the point spread functions used.

In the following, a proposed solution for the algebraic correction of the light sheet thickness, i.e., the deconvolution in the z-direction, is described in more detail according to an embodiment.

The discretization of the convolution vector in the dimension normal to the light sheet propagation plane forms a linear system of equations, which can be solved for any number of vertical grid points. If the system is simplified in that only the first grid points above and below the center of the light sheet are taken into account, the system of equations can be understood as a tridiagonal matrix N×N (with N the number of planes included), for which computationally fast solution algorithms, for example the Thomas algorithm, are known.

Provided that the tridiagonal convolution matrix is positive definite, that is, all its eigenvalues are real and positive, its inverse is also a tridiagonal matrix. Then, and only then, is an algebraic correction allowed. The result is a factor, constant for each combination of light sheet and measurement distance, by which the respective neighboring planes must be multiplied before they must be subtracted from the image plane to be corrected. This factor can be calculated once by matrix inversion, thus reducing the correction to a simple, direct algebraic equation per pixel under constant measuring conditions. The larger the plane distance between the light sheets, the smaller the amount of the multiplication factor, and the smaller the image sharpness gain by applying the correction. The condition of positive definiteness can be translated into a minimum distance between the measuring points, i.e. a minimum distance between the measured image planes. At smaller distances the matrix inversion becomes unstable and the above mentioned case of inverse psf with infinite entries occurs.

In this context, it is illustrative to consider that neighboring images at very small measurement distances are too similar to achieve a correction by simply subtracting the neighbors. The amount of the multiplication factor becomes so large that negative entries are created in the result image, which then have to be corrected by adding the next neighboring plane. This continues over the entire image stack.

This consideration shows that the property of macroscopy, i.e., the comparatively large (macropcopic) distance between the light sheet planes, which prevents the application of established deconvolution methods, is at the same time the property that allows the computation of a finite inverse psf. Moreover, the method can be adapted for each pixel according to the light sheet thickness, which also makes the inhomogeneity of the psf not a problem. In particular, the computational effort available can be reallocated to a local adaptation of the inverted matrix because the deconvolution of the single pixel is reduced to a simple multiplication and subtraction.

The implementation of the method requires the determination of a correction factor f1, which will be discussed in more detail in the following section based on embodiments. Once this factor is determined, various properties of the corrected image can be examined in frequency space.

The effect of the approach of correction by subtracting only the nearest neighbor using a correction factor will now be explained in more detail using a simulation. This is done to show the effect of subtracting the nearest neighbor using a correction factor for randomly generated images. For this purpose, random "one-dimensional" images, i.e. random intensity values, were generated to produce a random "one-dimensional image" with 500 pixels. Based on this, the correction was then made in which the neighboring intensity value multiplied by the correction factor f1 is subtracted, as in the case of the tridiagonal deconvolution matrix.

For the graphs in FIG. 1, f1 was assumed to be 0.26 and the algebraic correction was applied to randomly generated one-dimensional data sets (500 "pixels" each).

This simulation was repeated one hundred thousand times. FIG. 1 shows the averaged amplitudes in frequency space (i.e., after Fourier transform) of the random data set before ("original") and after correction by subtracting the neighbors multiplied by the correction factor. In addition, the quotient of the original and corrected amplitude response is shown. This would correspond in a classical deconvolution to the psf in frequency space. To get an impression of the variance within the simulations, the 99% quantiles of the quotient were also shown.

Figure 2:
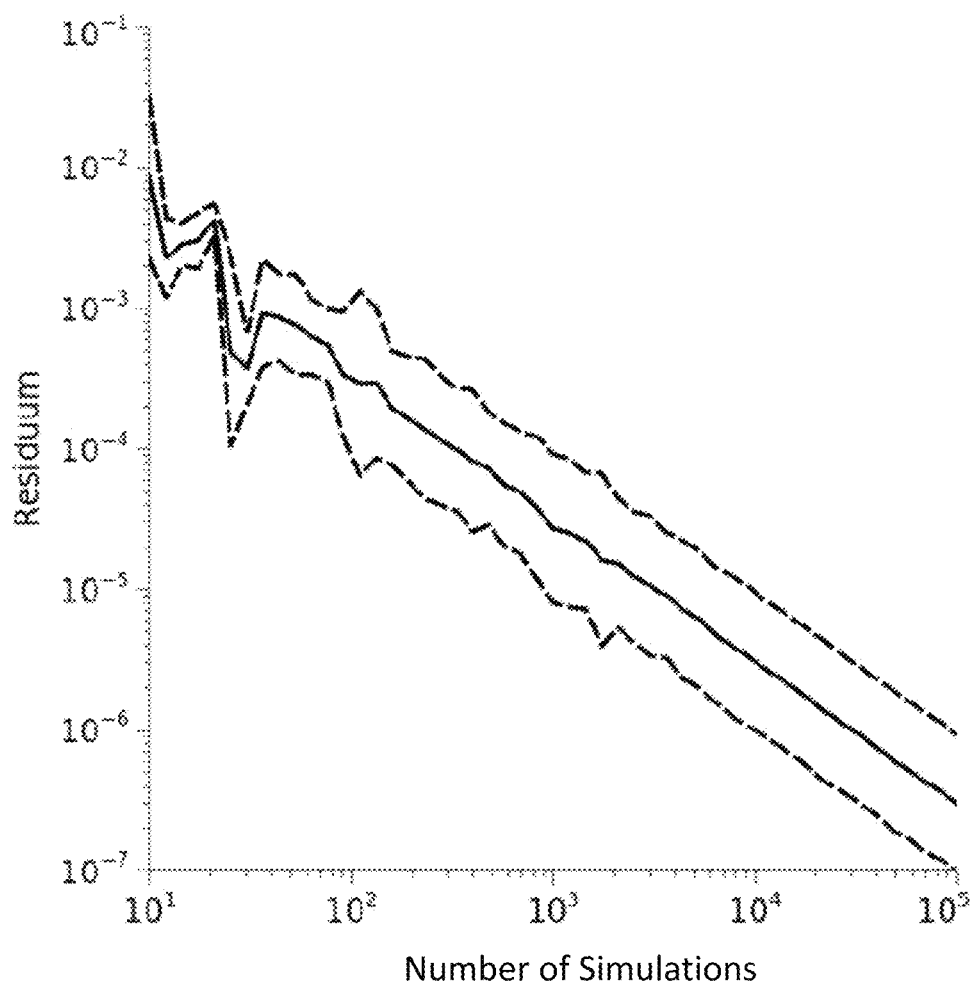

The change in the mean quotient over the course of the simulation is shown in the form of the residual in FIG. 2. It shows the standard deviation simulation residual as the ratio of the change in the mean amplitude of the quotient function (when a simulation is added) to the recalculated mean amplitude over all simulations.

The original 100 000 data points were averaged locally (along a logarithmic scale), reducing them to 50 data points, plus an additional data point for the ten initial simulations. The running standard deviation shown was calculated in the same way. For the residual itself, the course of the averaged amplitudes of the quotient was compared before and after adding a new simulated data point. After 100 000 simulations, the quotient function changes on average by less than a 10^-6th of its own mean.

Figure 3:
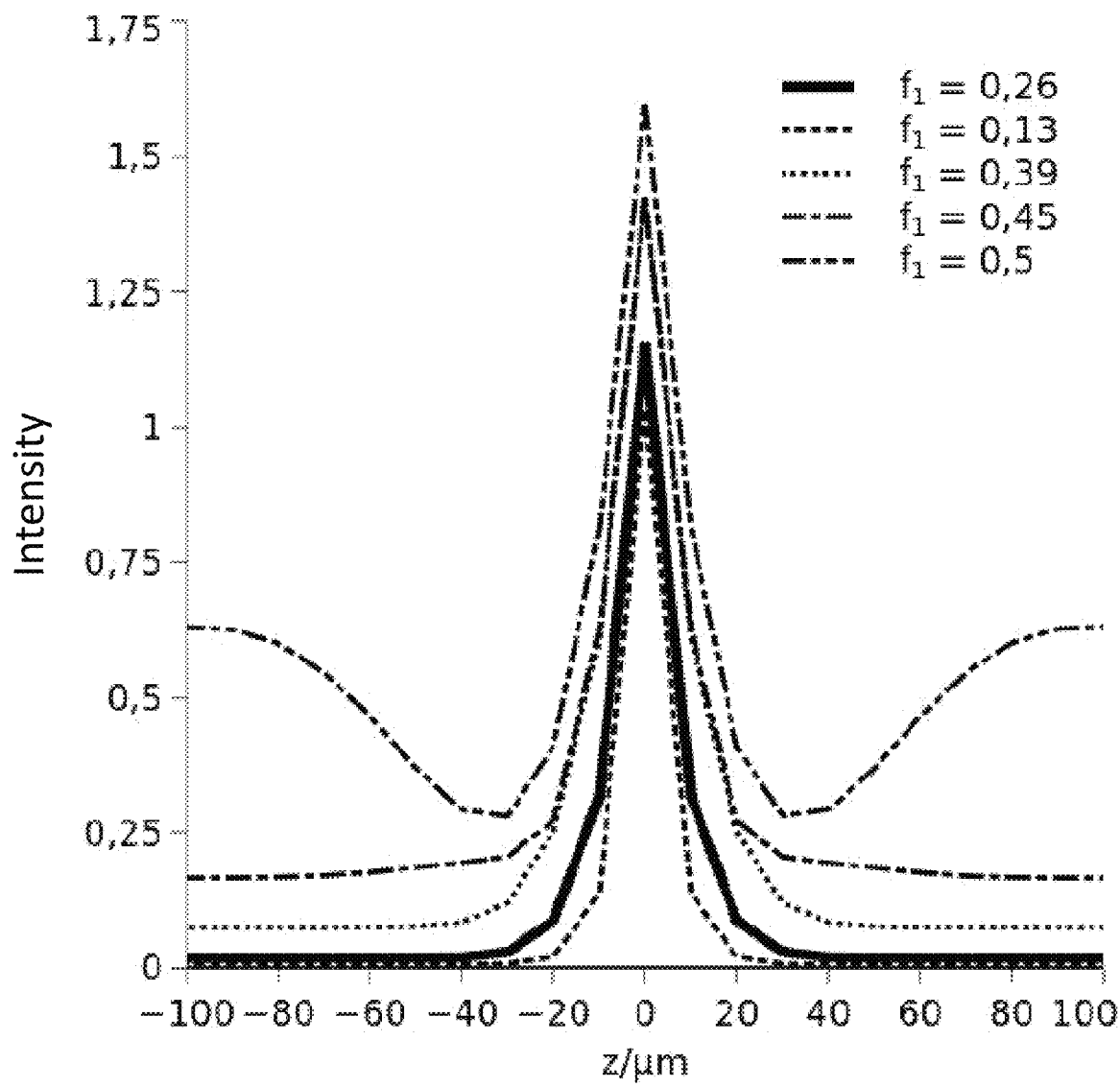

For FIG. 1 and FIG. 2, only the magnitudes of the frequency space were used. If the complex components, including phase, are obtained in the calculation of the quotient, this new complex frequency space function can be inverted to a real function in intensity space. Since both the original function and the corrected function are real in the intensity space, their equivalents in the frequency space have complex-conjugate entries. Their quotient thus remains complex-conjugate and the inverse (in intensity space) becomes real again (apart from numerical rounding errors). This function is shown in FIG. 3. It shows Fourier inverses of the simulated mean quotient function from FIG. 1 (f1=0.26) and for further correction parameters in frequency space.

Figure 4:
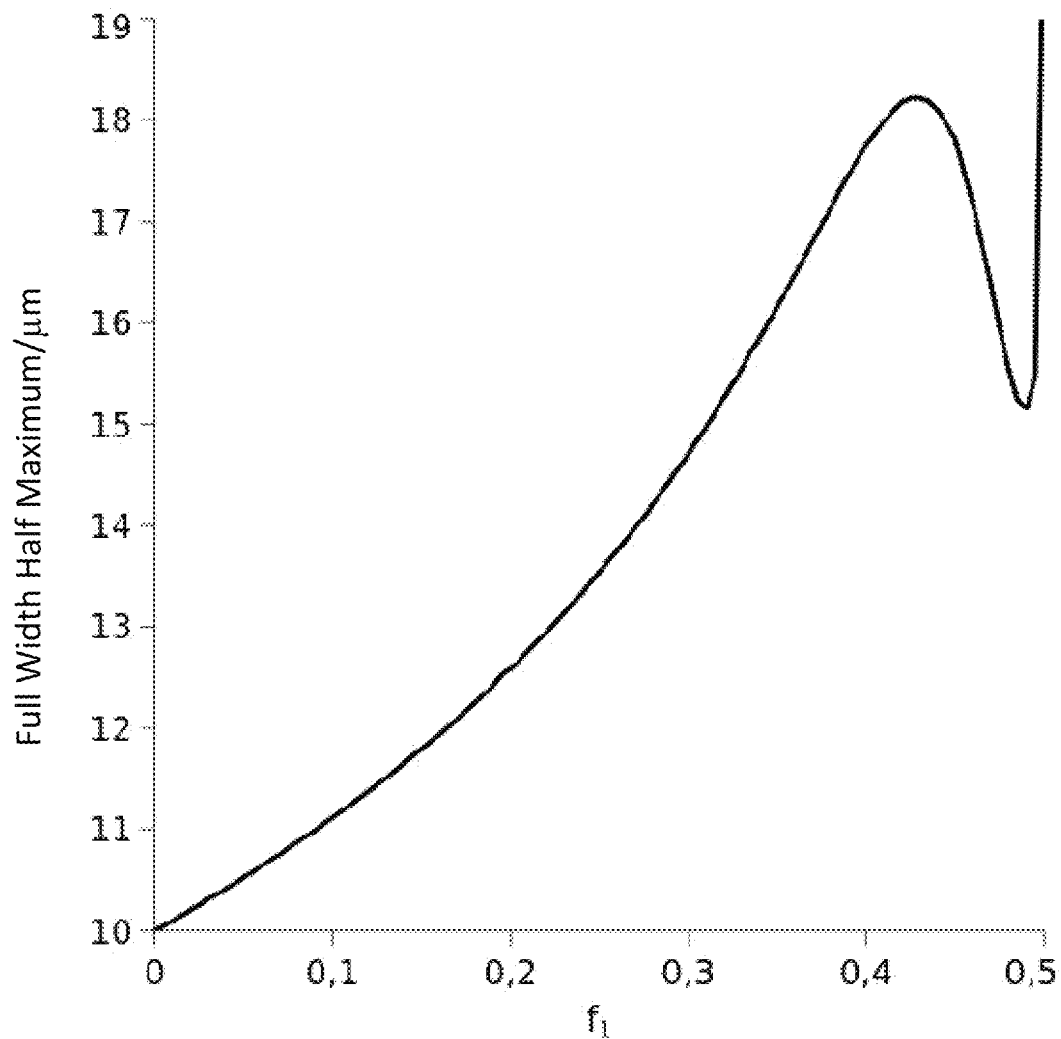

Assumed here is a distance of 10 µm between two images in the image stack, corresponding to the resolution in the plot. The shown distribution can be assigned, by linear interpolation between the data points, a half width of 13.8 µm. If another correction value is used instead of 0.26, another half-value width results, as also shown. The respective half-widths were calculated for different factors f1, which are plotted in FIG. 4. As expected, the half-width increases with increasing correction factor f1 until a local maximum of 18.2 µm half-width is reached at f1=0.43. After that, the function around 0 µm does not change anymore, instead the offset value in the periphery increases (see FIG. 3). At about f1=0.49, the half-widths increase again, and further local maxima are formed in the quotient function. The mathematical limit of stable invertibility is reached.

However, from the simulation it can be seen that the approach of subtracting the nearest neighbor using a correction factor is in principle suitable for stable deconvolution, as long as the distance of the planes is large enough with respect to the half-value width of the point spread function, for example, at least as large as the half-value width of the point spread function. This is the case for macroscopic light sheet microscopy, which is why this method can be used for deconvolution in the z-direction, i.e. light sheet thickness correction.

However, necessary for the application is the selection or determination of the correction factor f1. This empirical determination of the local (tissue depth dependent) correction factor is described in more detail below based on an embodiment.

The light sheet thickness before entering and after exiting the tissue can be directly determined experimentally. The experimental determination of the light sheet thickness before entering and after exiting the tissue can be used to constrain the initial function for f_1 downward and upward, which can improve the empirical determination of the function. However, the local course of the widening of the light sheet within the tissue is not trivial and cannot be readily determined. The same applies to a possible deflection of the light sheet out of the original exposure plane.

Based on an existing macroscopic light sheet measurement, the local widening of the light sheet is determined empirically according to an embodiment. The first assumption is that widening only occurs within the tissue. A global thresholding method (e.g. Otsu) is then used to distinguish between tissue and background. Thus, it is possible to assign a local tissue depth to each pixel within the tissue in the propagation direction of the light sheet.

According to an embodiment, a monotonically increasing function is used to model the widening of the light sheet in the tissue, which provides positive values for all tissue depths.

In addition, it is advantageous if no more than one or two parameters to be determined empirically are used in order to limit the computational effort. For example, a power function of the following form can be used:

$$f_1(x_T) = \frac{1}{2} - \frac{1}{x_T^n}$$

Here, f1 is the required correction factor, i.e., the value by which the neighboring planes are multiplied before they are subtracted from the plane to be corrected, $X_T$ is the tissue depth in pixels, and n is the previously unknown power. The function described tends (for n>0) toward the theoretical maximum correction value of 0.5 as tissue depth $X_T$ increases. To avoid negative f1, the function for small $X_T$ is set to the correction value of the unperturbed light sheet in tissue $f_{1,0}$. This can be determined empirically by performing the correction with different values for $f_{1,0}$ at the tissue edge facing the light sheet. The value of $f_{1,0}$ that provides the highest image contrast (or subjectively best image impression) is selected as the parameter. The lower limit of the tissue depth $X_{T,0}$ with known undisturbed light sheet thickness $f_{1,0}$ ((in the present example 0.26) is calculated from the above equation to:

$$x_{T,0} = \frac{1}{\sqrt[n]{\frac{1}{2} - f_{1,0}}}$$

After each correction, the contrast in the image foreground is calculated as the standard deviation of the corrected intensities of the image foreground, relative to the mean intensity (cf. PELI, Eli. Contrast in complex images. JOSA A, 1990, 7th ed. no. 10, pp. 2032-2040). For demonstration purposes, the method was applied to a light sheet measurement of a human appendix, which had previously been optically cleared, using a method as described in DE 102016123458 B3.

Figure 5:
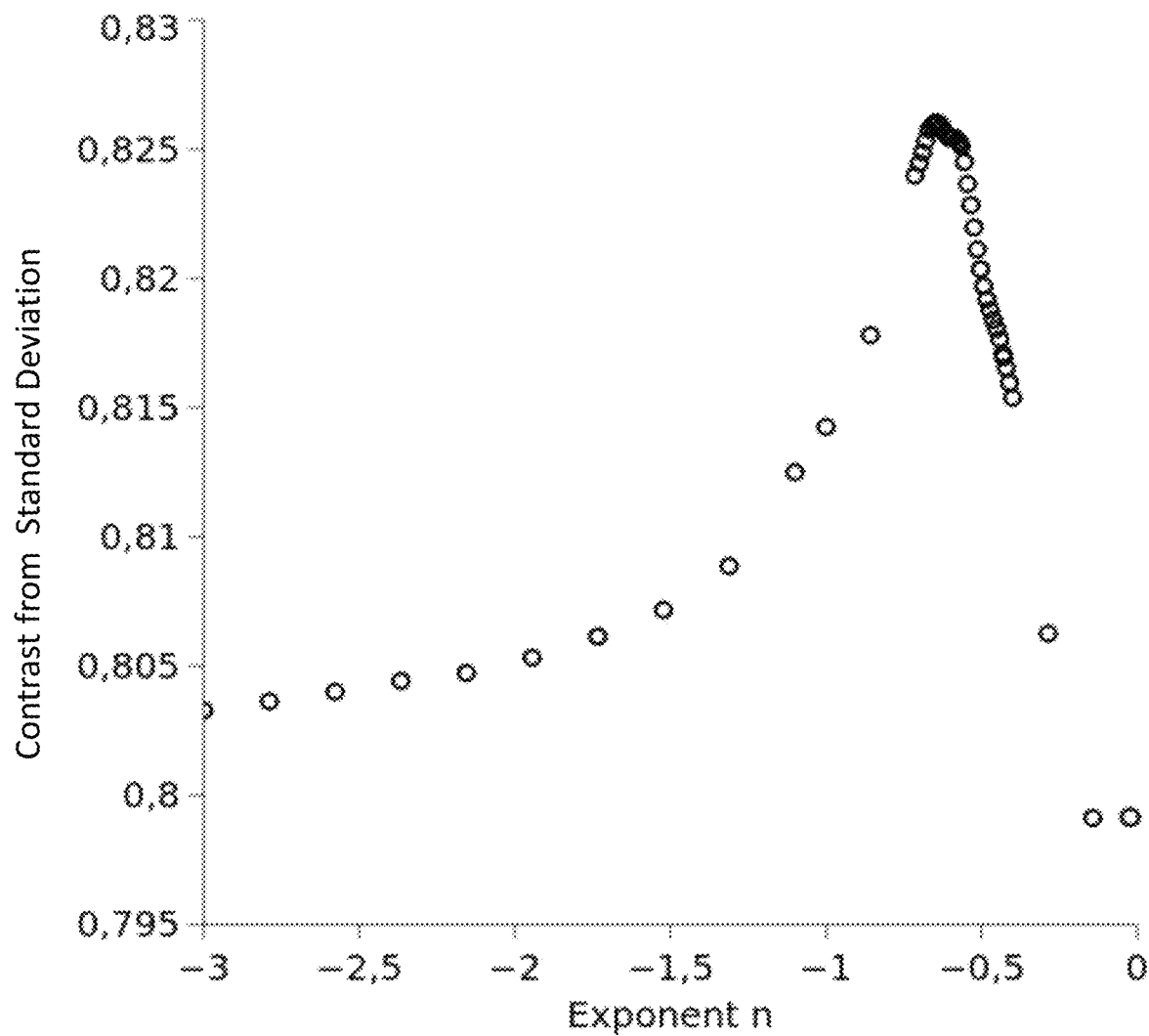
FIG. 5 shows the dependence of the image quality on an exponent of the approach function f_1(x) according to an embodiment.

The result is the curve of the contrast value as a function of the exponent of the correction function shown in FIG. 5. The optimum overall contrast is achieved here at an exponent of −0.65.

In principle, the described method can be varied and extended as desired by using a different criterion for image quality (instead of contrast or with a different definition of image contrast) or by using a different initial function for the tissue depth-dependent correction factor. In addition, the number of free variables can be increased. By assuming different correction factors above and below the image, a deflection of the light sheet away from the exposure plane can be mapped. According to an embodiment, the use of a numerical-iterative method for solving non-linear minimization problems, for example the Gauss-Newton method, with the associated increased computational effort, can then be employed in this process.

Once the correction function has been determined, the same correction function determined once can always be used for several light sheet measurements with the same tissue types and clearing protocols.

Following the description of deconvolution in the z-direction, tissue depth-dependent deconvolution perpendicular to the objective axis is described in more detail below, according to one embodiment.

After the correction of the light sheet thickness has been performed for all planes in the image stack, the "actual deconvolution", i.e. the deconvolution in lateral direction (in the x/y plane), is performed. Due to the separation between axial and lateral psf (light sheet thickness and scattering when transmitted through the tissue), a two-dimensional psf remains after correction for light sheet thickness.

The extent of this psf depends on the light path length between the point of origin of the emission and the tissue boundary in the direction of the objective, i.e., perpendicular to the exposure plane in the case of a light sheet microscope. Experimental determination of these psf with fluorescent beads allows the shape of the psf to be determined, but not its size in real tissue.

Similar to the case of the penetration depth-dependent correction factor for the light sheet correction, according to one embodiment, the extent of the psf is determined as a function of tissue depth. Analogous to the procedure described above, each voxel within the tissue is assigned a tissue depth, now in the axial (z) direction instead of in the direction of the spread of the light sheet. According to an embodiment example, a power function again serves as the starting function of the psf radius rpsf.

Monte Carlo simulations of scattering within tissues showed that light beams expand monotonically increasing with increasing tissue depth, but the increase of this expansion decreases steadily (cf. FLOCK, Stephen T., et al. Monte Carlo modeling of light propagation in highly scattering tissues. I. Model predictions and comparison with diffusion theory. IEEE Transactions on Biomedical Engineering, 1989, 36th ed. no. 12, pp. 1162-1168). A power function with an exponent $0<n<1$ satisfies this condition.

$$r_{psf} = \left(k\frac{z_T}{\Delta z}\right)^n$$

In the above equation, $Z_T$ denotes the local tissue depth and $\Delta z$ the image resolution in the axial direction. Thus, knowing the exponent n, it allows the calculation of the expansion of the psf. The constant normalization factor k is used to scale the psf radius and can initially be chosen arbitrarily. In the example shown here, k=0.5 was set. It can be corrected based on the empirical determination of the exponent n, which is described below.

Figure 6:
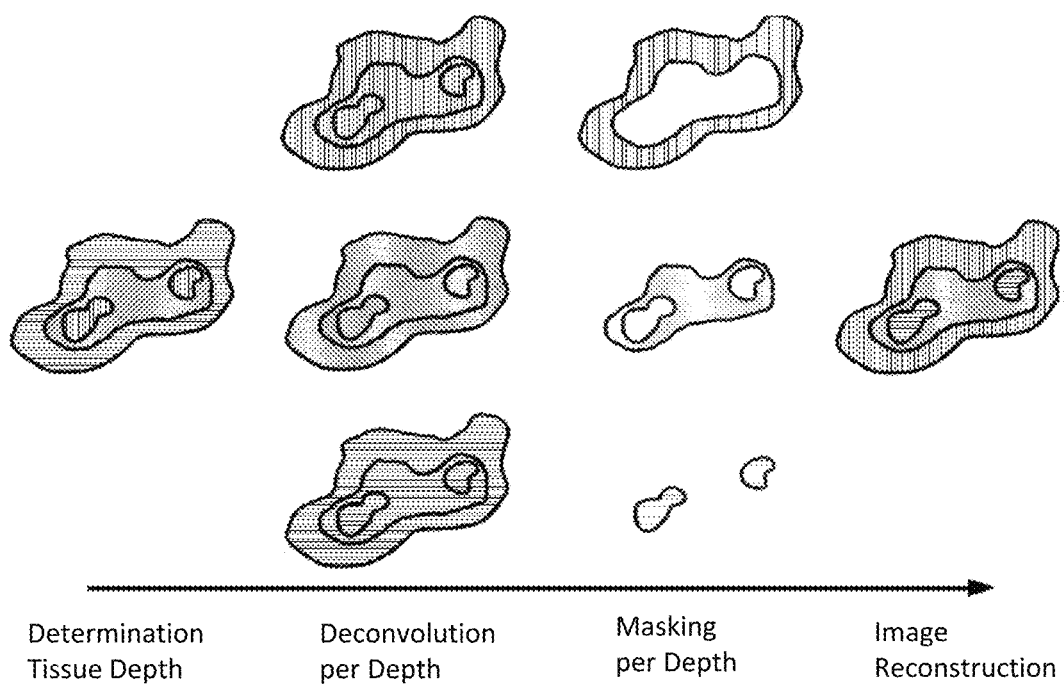
FIG. 6 schematically shows the processing steps of deconvolution in the x/y plane according to an embodiment.

To implement this local deconvolution procedure, the image is divided into three to five regions of similar tissue depth at each level. The local psf is then calculated as an Airy function with the depth-dependent radius for each region. The radius rpsf here corresponds to the position of the first zero of the Airy function. Deconvolution is then performed by using the Richardson-Lucy algorithm for each psf for the entire image. Thus, five deconvolved images are obtained for five areas. Each of these is masked (the particular areas of similar depth are used as masks) and combined to form the overall deconvolved image. This process is performed for each image in the image stack. For illustration, the whole described procedure is shown in FIG. 6.

Figure 7:
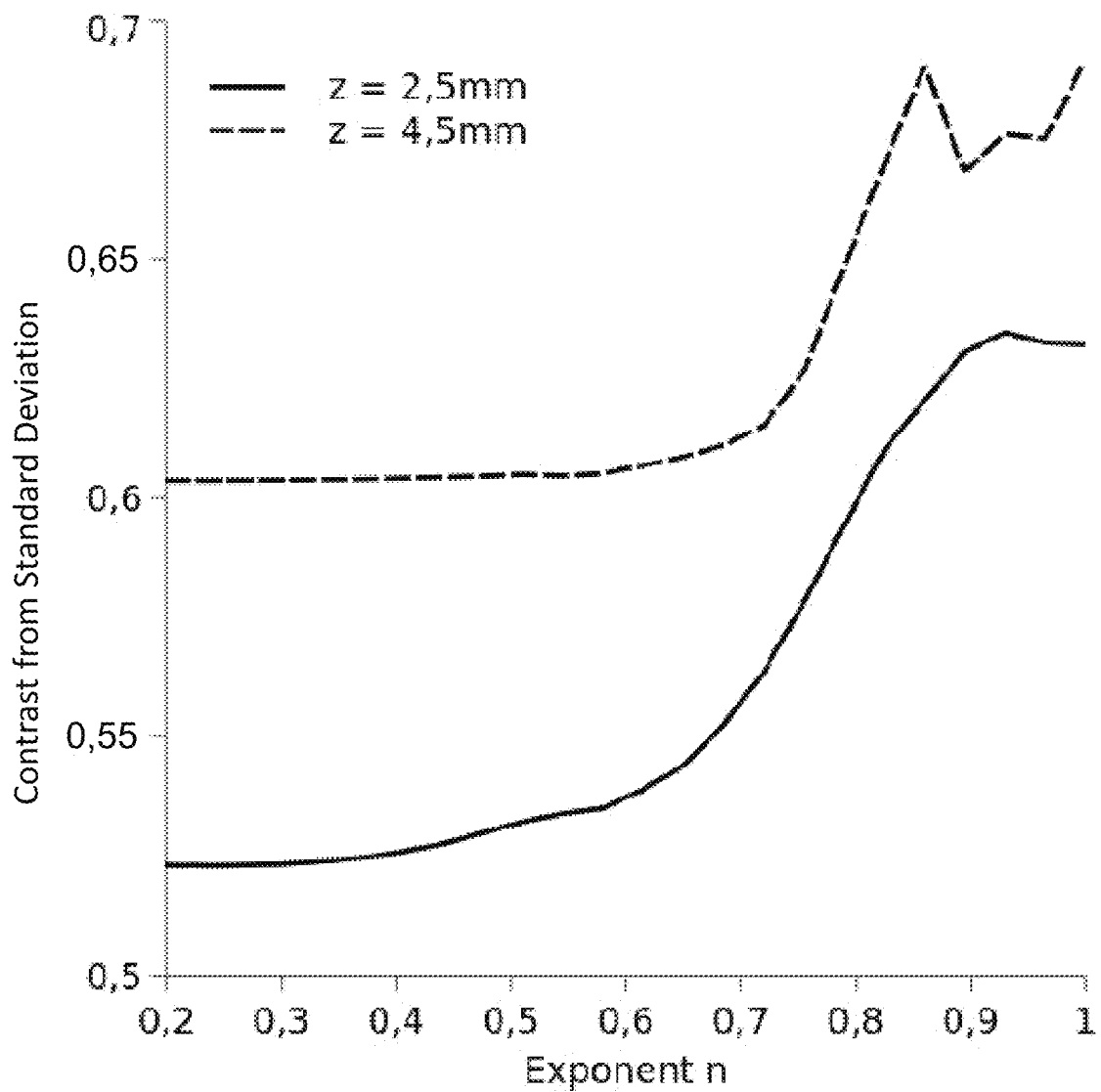
FIG. 7 shows the image contrast as a function of the correction exponent of the function r_psf(z) according to an embodiment.
Figure 8:
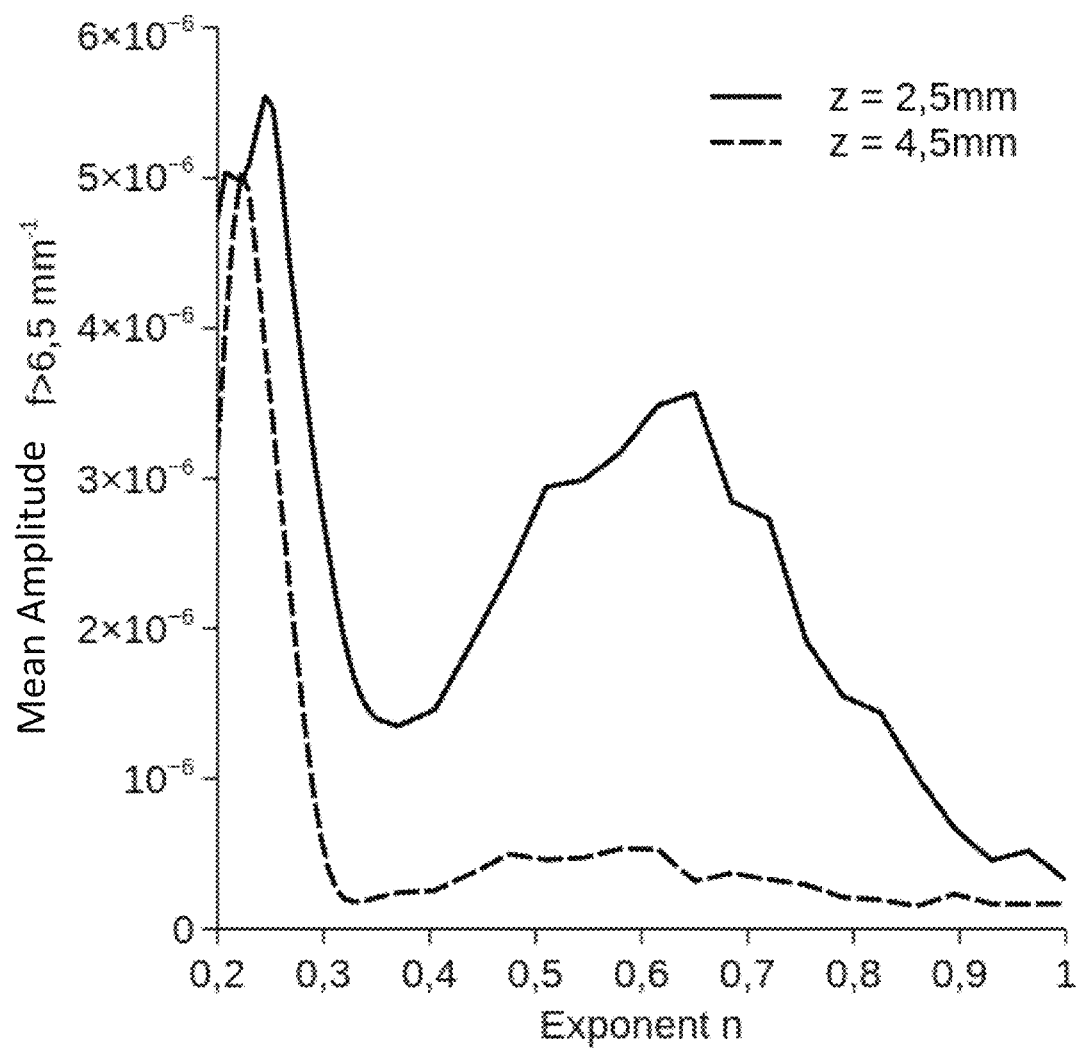
FIG. 8 shows the mean amplitude of the high spatial frequencies as a function of the correction exponent of the function r_psf(z) for two different image depths.

The value of the correction exponent n depends on the optical properties of the tissue under examination at the given excitation or emission wavelength. As FIG. 7 shows, the image contrast in terms of the standard deviation of intensities in the tissue increases with n. However, a too "large" psf leads to ring artifacts in the image, visible by an increase in the amplitudes of high spatial frequencies (cf. FIG. 8).

An exponent n=0.37 still shows no ring artifacts in the two image planes considered for cleared lymphoid tissue and is therefore used for deconvolution in the present embodiment.

If a deconvolved image without ring artifacts cannot be generated for any exponent n, the normalization factor k is preferably corrected downward. If the frequency contrast shows a broad plateau of low amplitudes over long stretches of n, k can be increased. In both cases, the empirical determination of n is then repeated.

According to an embodiment, the complete algorithm for correction and contrast enhancement of light sheet measurements consists of six individual steps: Determination of a global threshold intensity, low pass filtering, local light sheet correction, tissue depth dependent deconvolution and adjustment of the intensity distribution along the light sheet.

Figure 9:
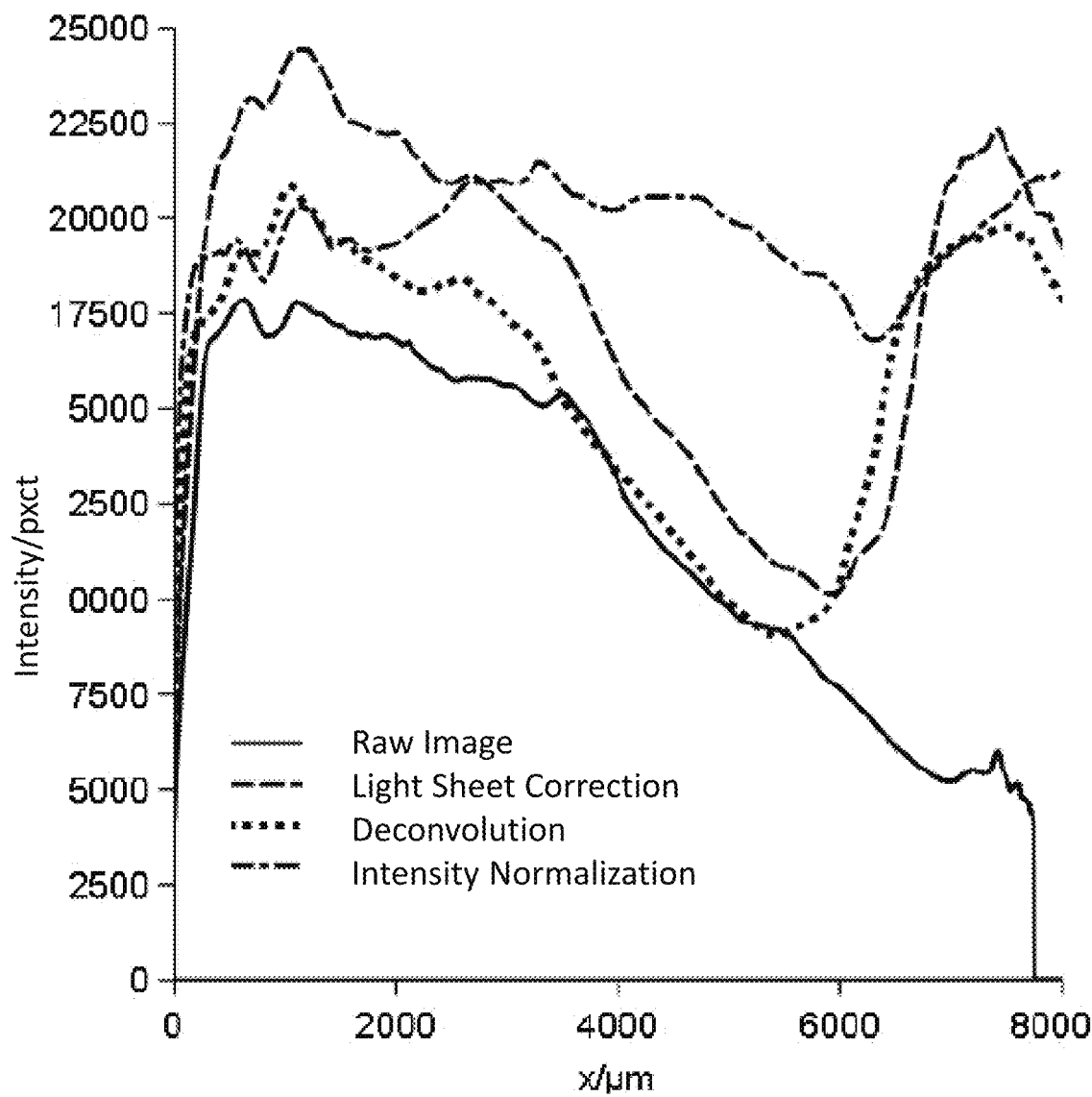
FIGS. 9 to 12 show the mean intensities and contrast along the light sheet for the process steps according to an embodiment on two different tissue samples.

In FIGS. 9 to 12, mean intensity and contrast (as standard deviation of intensity) along the light sheet are shown for the most important process steps using two exemplary tissues. Each data point represents the set of all points within the tissue that have the same distance from the tissue edge in the propagation direction of the light sheet. The intensity curve of the appendix in FIG. 9 shows a dip between 4 mm and 6 mm tissue depth after applying the light sheet correction. This is caused by the intestinal lumen of an appendix in the center of the tissue.

According to an embodiment example, the global threshold intensity is calculated in two steps. First, a mean-z projection along the objective axis is calculated. Then, a global Otsu thresholding procedure is applied to this result image. The calculated threshold value is then corrected downward with a safety factor of 0.6.

The low-pass filter is an ideal FFT filtering with a circular mask that zeros out the 20% highest spatial frequencies in the image. This is followed by light sheet correction and tissue depth-dependent deconvolution as described above.

Due to absorption and scattering, the excitation intensity decreases with increasing distance from the light sheet origin. Therefore, after light sheet correction, the intensities are adjusted along the light sheet. For each image in the stack, the average intensity is calculated as a function of tissue depth. The assignment of voxels to tissue depth is analogous to the description above for light sheet correction and deconvolution, in this case in the propagation direction of the light sheet. The individual voxels in the tissue are then divided by the average intensity in the tissue just determined. Subsequently, the entire single image is normalized back to the order of magnitude of the desired image depth (e.g. 8-bit or 16-bit).

Figure 10:
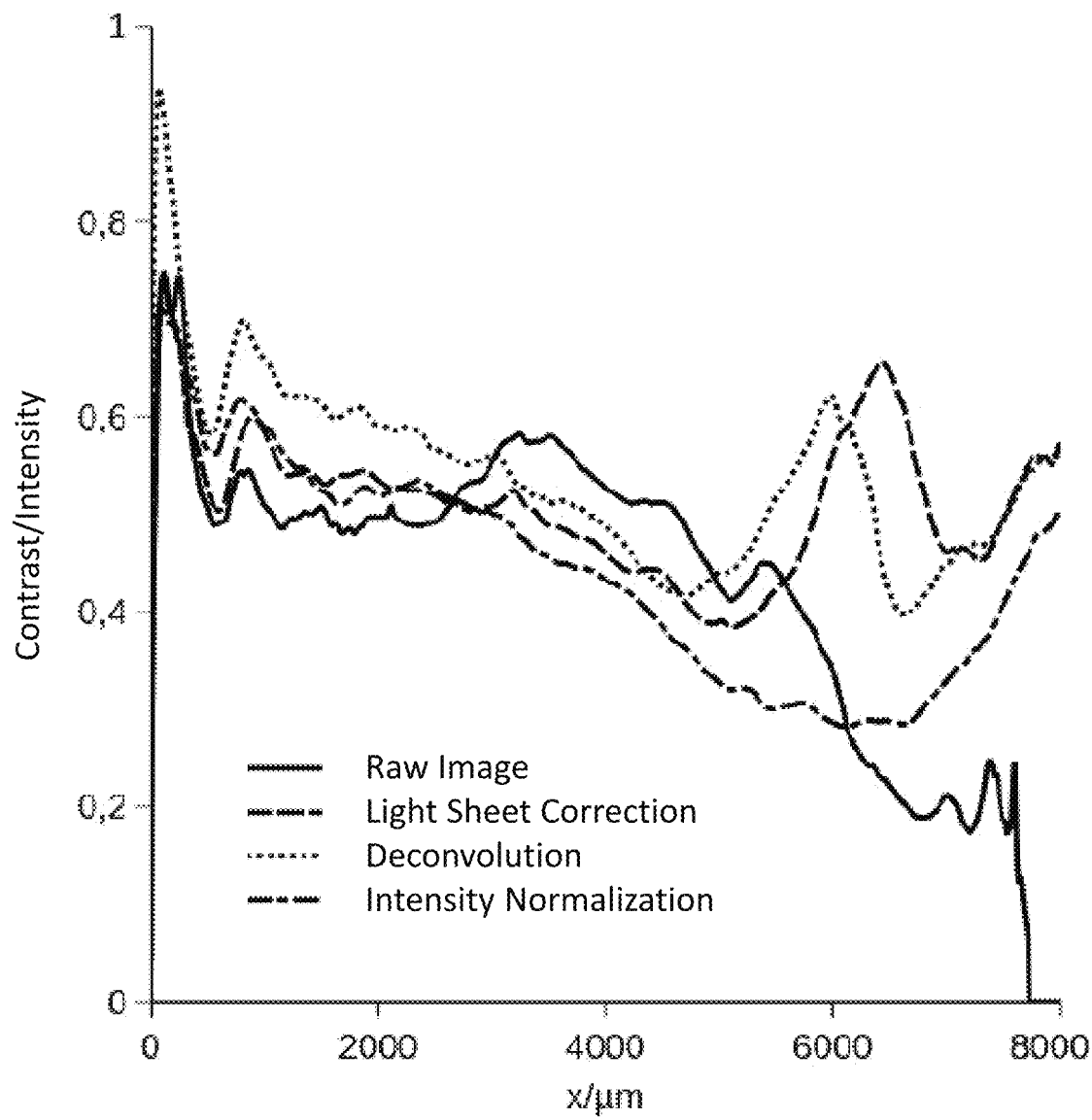

For FIGS. 13 to 17, light sheet images of a single plane were exemplified after the respective processing steps, i.e. original image, Fourier filtering, light sheet thickness correction, lateral deconvolution and intensity adjustment. The curves in FIGS. 9 and 10 are also taken from the tissue shown, clearly illustrating the effects of the individual processing steps. The light sheet correction adds new information to the single image so that new structures become visible. The tissue depth-dependent deconvolution reproduces these new structures more sharply. The equalization of the intensity distribution makes parts of the image that lie deep in the tissue more prominent.

Figure 11:
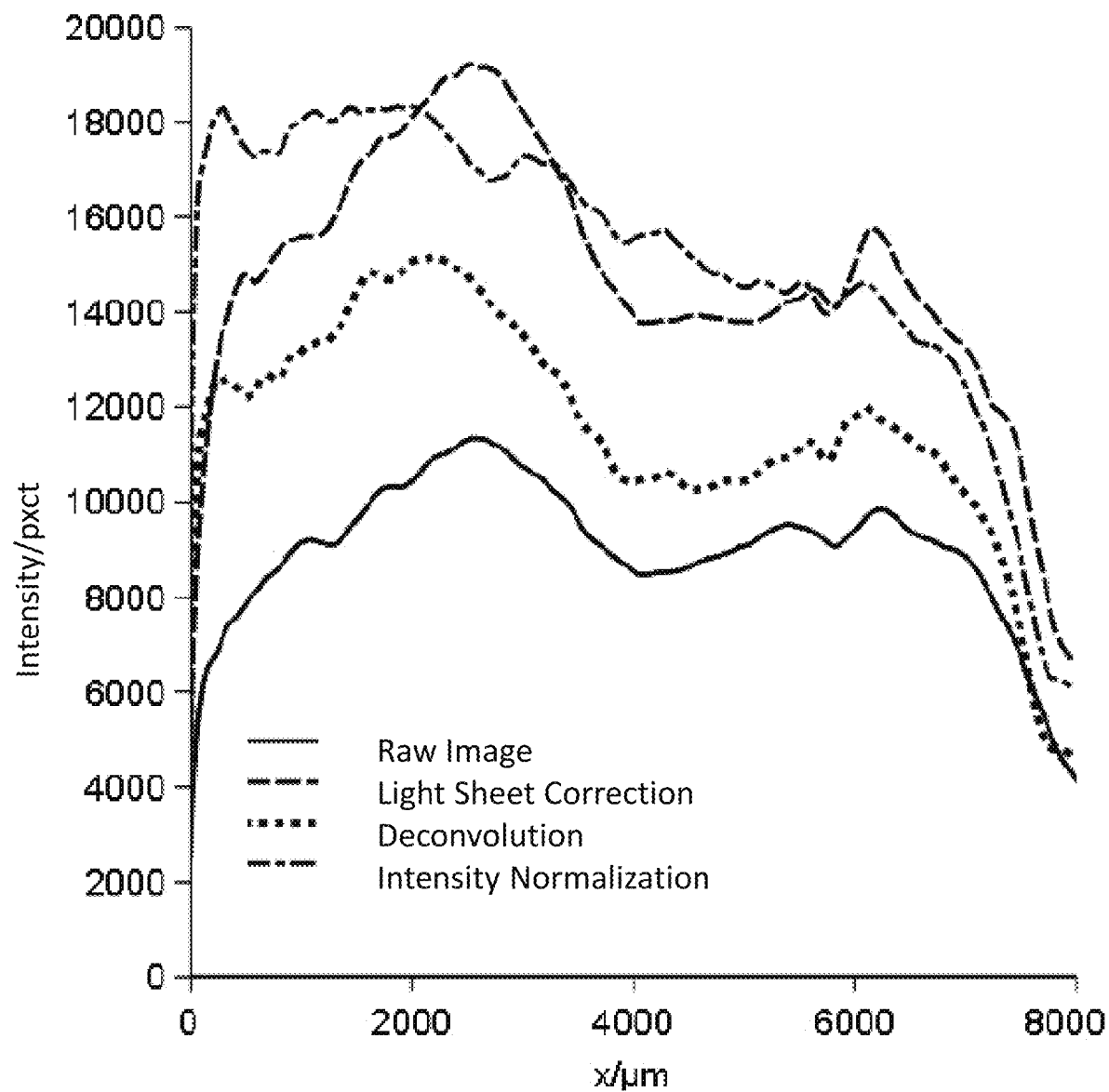
Figure 12:
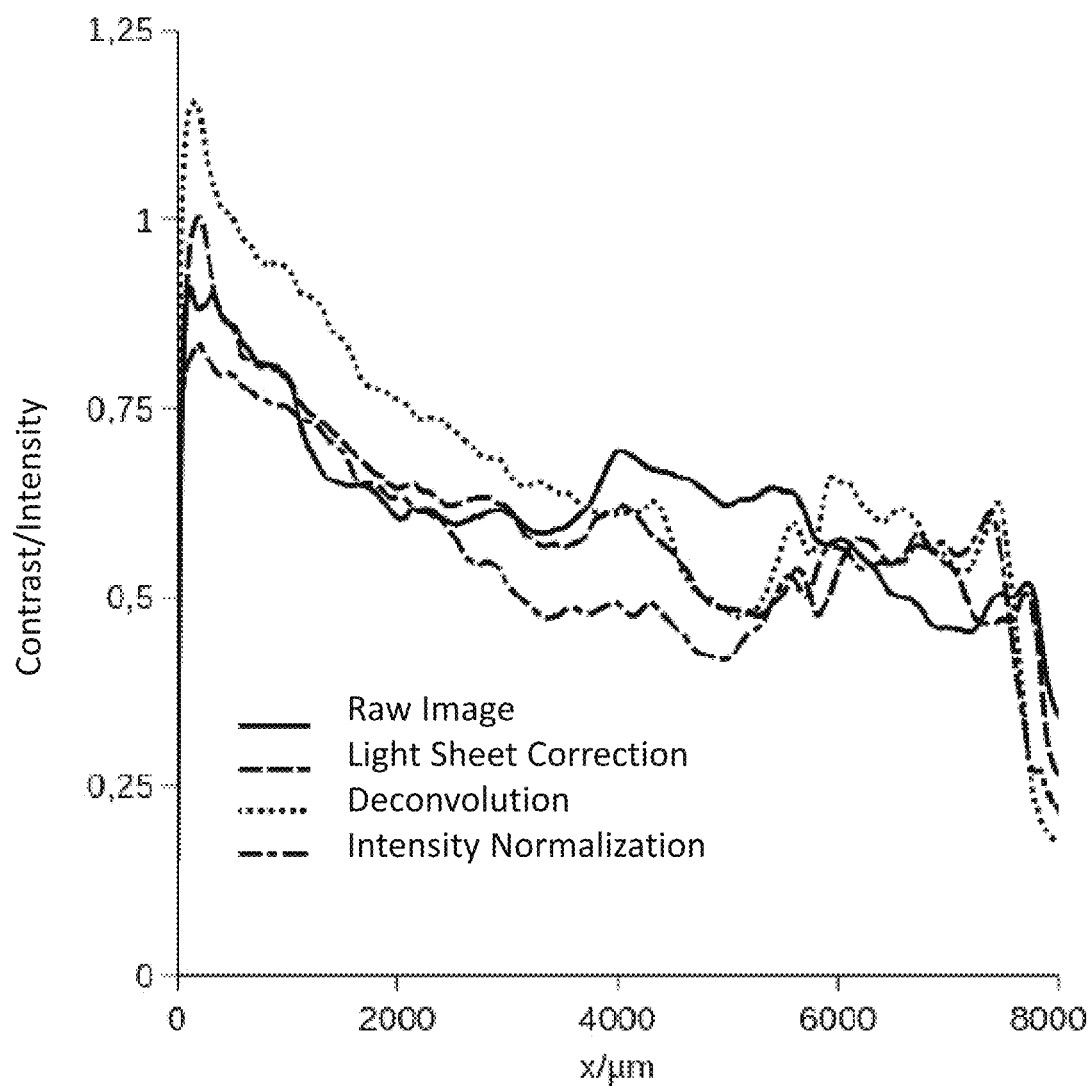
Figure 13:
FIGS. 13 to 19 show light sheet images of a single plane after the processing steps according to an embodiment on two different tissue samples.
Figure 14:
Figure 15:
Figure 16:
Figure 17:
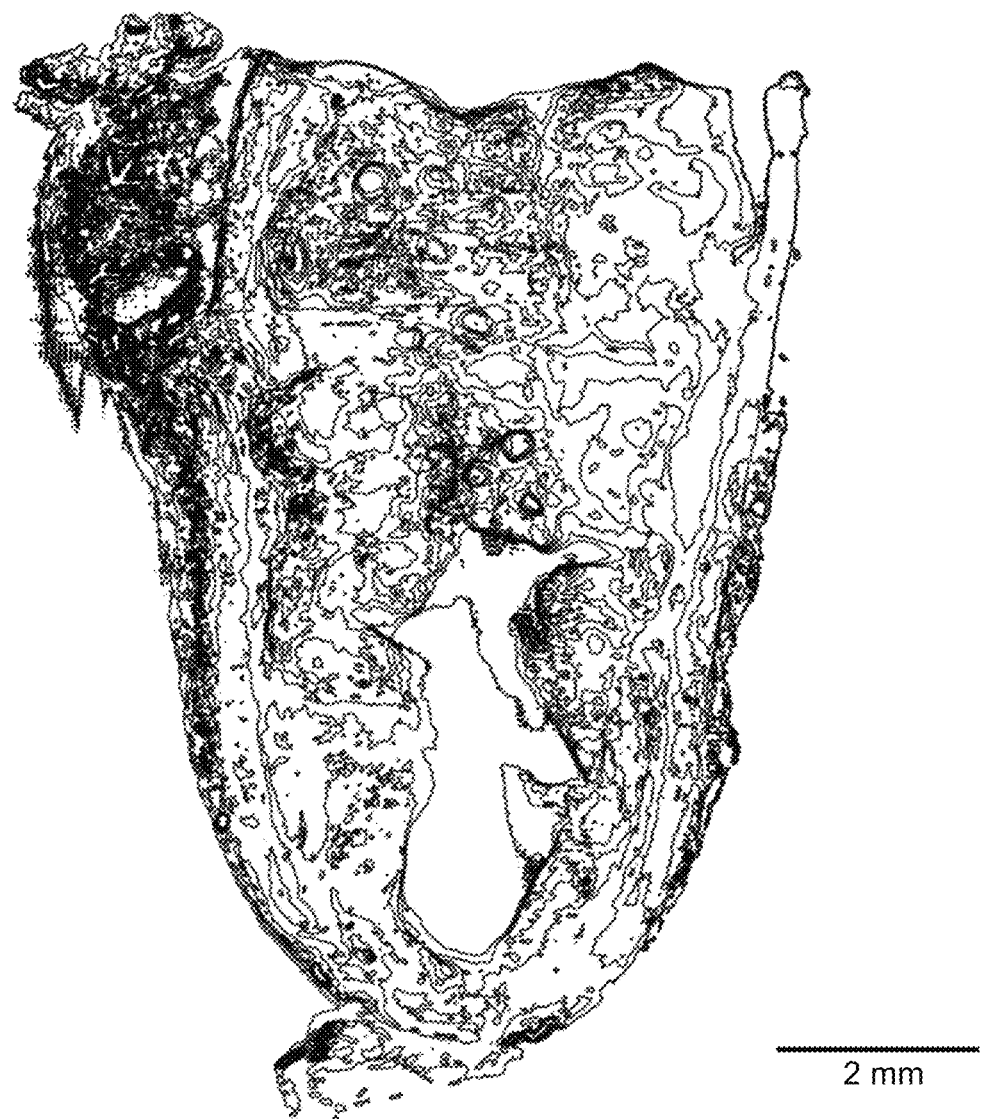
Figure 18:
Figure 19:
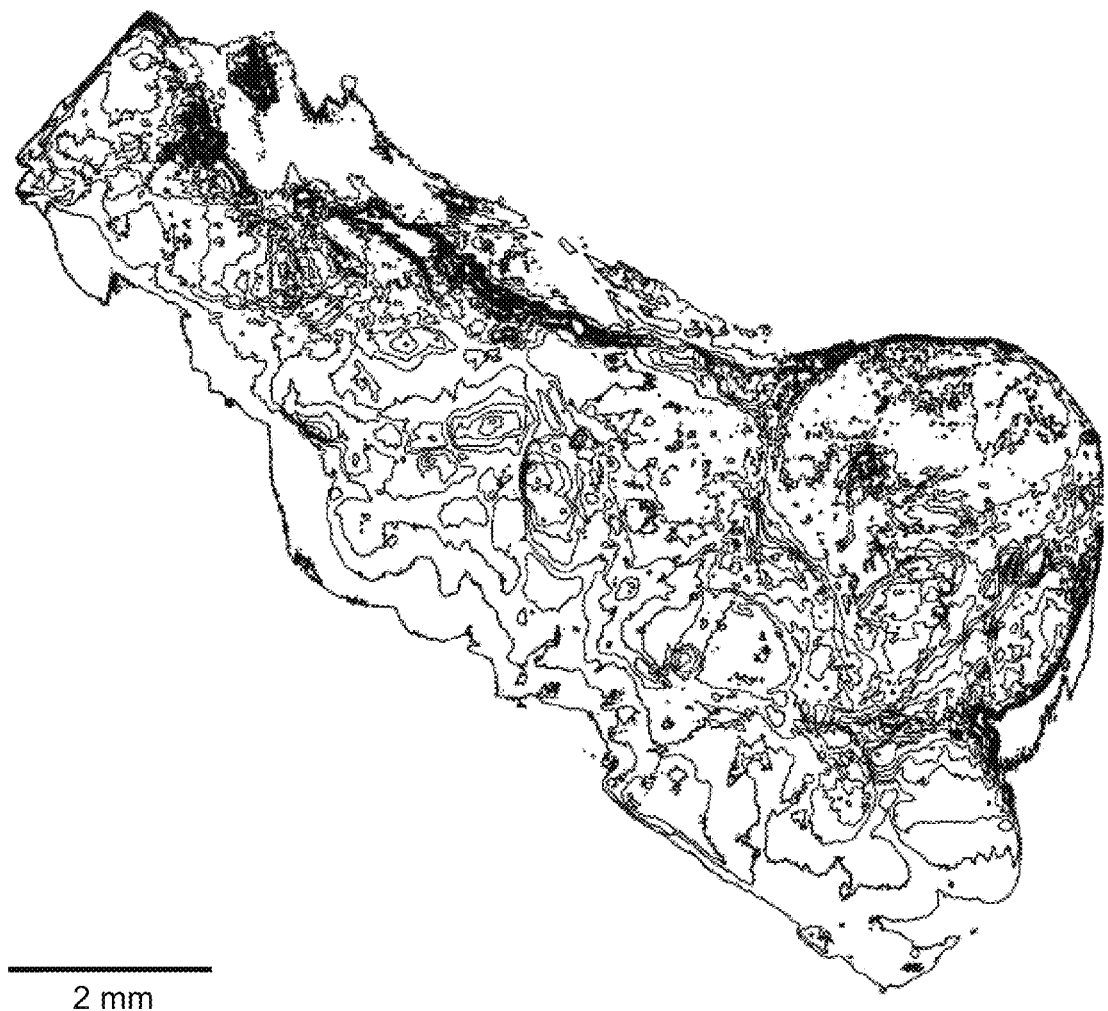

As another example, FIG. 18 and FIG. 19 compare a light sheet microscopy image of a human thymus before and after the entire procedure described. The curves for FIGS. 11 and 12 are also taken from this tissue image. The 16-bit grayscale images were converted into contour plots with ten iso-lines of equal intensity each.

The skilled person will recognize that the described procedures for contrast enhancement can be implemented by means of a computer program running on a commercially available computer. On the basis of the foregoing description, it is readily possible for the skilled person to design a corresponding computer program. For this purpose, the image data, i.e. the intensities of the voxels of the light sheet microscope image, are subjected to the described mathematical operations, which are implemented by means of a corresponding computer program.

The image processed by means of the described methods is a technical entity, the contrast enhancement of an image, in particular of a microscope image, is a technical effect or the solution of a technical problem which is solved in a new, non-obvious way by the methods described in the embodiment examples as well as by the methods defined in the claims.

What is claimed:

1. A method of contrast enhancement of a three-dimensional light sheet microscopy image formed from N individual images each corresponding to a light sheet plane and spaced apart from each other in the z-direction by at least a distance d, the x/y-plane being the light sheet plane and the x-direction being the propagation direction of the light sheet of the light sheet plane, the method comprising:
deconvoluting the three-dimensional image in the z-direction, comprising:
for each intensity vector of N intensities ($I_{x,y,1}, \ldots, I_{x,y,N}$) having the same x/y value, performing a multiplication with a tridiagonal N×N deconvolution matrix, which assigns to each voxel (x, y, n) a correction parameter f1, with which, by the multiplication of the deconvolution matrix with the intensity vector, for a component I(x, y, n) of the intensity vector the intensities Ix, y, n+1 and Ix, y, n−1 of the corresponding voxels of the neighboring image plane are multiplied, before they are subtracted from the intensity value I(x, y, n);
deconvolving the image in the x/y plane for each image plane using a two-dimensional point spread function whose radius depends on the tissue depth of the voxel to be deconvolved in the z-direction; and
for each image plane, performing the two-dimensional deconvolution for different point spread functions that are tissue depth dependent;
computing a quality measure for the deconvolved image; and
selecting a tissue depth dependent point spread function that leads to an improved quality measure for the deconvolved image from the plurality of point spread functions for which the deconvolution has been computed.

2. The method of claim 1, wherein;
the correction factor f1 is selected to be larger with increasing penetration depth of the light sheet into the tissue in the x-direction.

3. The method of claim 1, wherein: for the tissue depth-dependent point spread function, a function is used the radius of which increases with increasing tissue depth, whereby, however, preferably the increase of the radius increase decreases steadily.

4. The method of claim 1, wherein as the point spread function a function is chosen for which the average amplitude of the high spatial frequencies lying beyond a spatial frequency threshold is a minimum or does not deviate from a minimum by more than a predetermined threshold value.

5. The method of claim 1, wherein the distance between two light sheet planes is greater than the half-width of the point spread function in the z-direction.

6. A non-transitory computer readable medium comprising computer program code which, when executed by a computer, causes the computer to perform a method of contrast enhancement of a three-dimensional light sheet microscopy image formed from N individual images each corresponding to a light sheet plane and spaced apart from each other in the z-direction by at least a distance d, the x/y-plane being the light sheet plane and the x-direction being the propagation direction of the light sheet of the light sheet plane, the method comprising:
deconvoluting the three-dimensional image in the z-direction, comprising:
for each intensity vector of N intensities ($I_{x,y,1}, \ldots, I_{x,y,N}$) having the same x/y value, performing a multiplication with a tridiagonal N×N deconvolution matrix, which assigns to each voxel (x, y, n) a correction parameter f1, with which, by the multiplication of the deconvolution matrix with the intensity vector, for a component I(x, y, n) of the intensity vector the intensities Ix, y, n+1 and Ix, y, n−1 of the corresponding voxels of the neighboring image plane are multiplied, before they are subtracted from the intensity value I(x, y, n);
determining the correction parameter f1 at the point of entry of the light sheet into the tissue by:
calculating the deconvolution as well as a quality measure of the deconvolved image based on different correction parameters f1 for a section of the whole image comprising the first k voxels in x-direction starting from the penetration location of the light sheet, where k is small compared to the extent of the image in x-direction; and choosing the correction parameter f1 for which the calculated quality measure corresponds to the largest quality improvement.

7. A method of contrast enhancement of a three-dimensional light sheet microscopy image formed from N individual images each corresponding to a light sheet plane and spaced apart from each other in the z-direction by at least a distance d, the x/y-plane being the light sheet plane and the x-direction being the propagation direction of the light sheet of the light sheet plane, the method comprising:

deconvoluting the three-dimensional image in the z-direction, comprising:

for each intensity vector of N intensities (Ix, y, 1, ..., Ix, y, N) having the same x/y value, performing a multiplication with a tridiagonal N×N deconvolution matrix, which assigns to each voxel (x, y, n) a correction parameter f1, with which, by the multiplication of the deconvolution matrix with the intensity vector, for a component I(x, y, n) of the intensity vector the intensities Ix, y, n+1 and Ix, y, n−1 of the corresponding voxels of the neighboring image plane are multiplied, before they are subtracted from the intensity value I(x, y, n);

representing the dependence of the correction parameter f1 on the penetration depth in the x-direction by a monotonically increasing function of the correction value f1(x);

calculating, for different functions f1(x), the respective deconvolution in z-direction of the whole image as well as a quality measure of the deconvolved whole image; and selecting that function f1(x), which provides the best quality measure, as a function to represent the entry depth dependent correction value f1(x).

* * * * *